US006864001B2

(12) United States Patent
Zhang et al.

(10) Patent No.: US 6,864,001 B2
(45) Date of Patent: Mar. 8, 2005

(54) TETRAMETHYL ORTHOCARBONATE FUEL CELLS AND SYSTEMS AND METHODS RELATED THERETO

(75) Inventors: Jiujun Zhang, Richmond (CA); Kevin Colbow, West Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 175 days.

(21) Appl. No.: 10/243,984

(22) Filed: Sep. 13, 2002

(65) Prior Publication Data

US 2004/0053084 A1 Mar. 18, 2004

(51) Int. Cl.[7] .............................................. H01M 8/04
(52) U.S. Cl. ............................ 429/15; 429/12; 429/13
(58) Field of Search ............................ 429/12, 13, 15, 429/17

(56) References Cited

U.S. PATENT DOCUMENTS

| 5,268,008 A | * | 12/1993 | Kanne .......................... 44/444 |
| 5,364,711 A | | 11/1994 | Yamada et al. ............... 429/15 |
| 6,326,097 B1 | | 12/2001 | Hockaday ..................... 429/34 |
| 6,673,480 B1 | * | 1/2004 | Wilkinson et al. ............ 429/13 |

FOREIGN PATENT DOCUMENTS

| CA | 2315325 | 9/1999 |
| WO | WO 96/12317 | 4/1996 |

OTHER PUBLICATIONS

Mench et al., "Design of a micro direct methanol fuel cell," Proceedings of the IMECE '01, International Mechanical Engineering Congress and Exposition, New York, NY, Nov. 11–16, 2001.*

Mench et al., "Design of a micro direct methanol fuel cell ($\mu$DMFC)," *Proceedings of the IMECE '01, International Mechanical Engineering Congress and Exposition*, New York, NY, Nov. 11–16, 2001.

Narayanan et al., "Design and Development of Miniature Direct Methanol Fuel Cell Power Sources for Cellular Phone Applications," *2000 Fuel Cell Seminar Abstracts*, Portland, Oregon, USA. Oct. 30–Nov. 2, 2000, pp. 795–798.

* cited by examiner

*Primary Examiner*—Dah-Wei Yuan
(74) *Attorney, Agent, or Firm*—Seed IP Law Group PLLC

(57) ABSTRACT

Fuel cells are disclosed that operate directly on fuel streams comprising tetramethyl orthocarbonate in which tetramethyl orthocarbonate is directly oxidized at the anode and, more particularly, to solid polymer fuel cells operating directly on liquid fuel streams comprising tetramethyl orthocarbonate. Also disclosed are methods relating thereto.

22 Claims, 7 Drawing Sheets

TETRAMETHYL ORTHOCARBONATE FUEL CELLS AND SYSTEMS AND METHODS RELATED THERETO

BACKGROUND OF THE INVENTION

1. Field of the Invention

The present invention generally relates to fuel cells operating directly on fuel streams comprising tetramethyl orthocarbonate in which tetramethyl orthocarbonate is directly oxidized at the anode and, more particularly, to solid polymer fuel cells operating directly on liquid fuel streams comprising tetramethyl orthocarbonate.

2. Description of the Related Art

Solid polymer electrochemical fuel cells convert reactants, namely fuel and oxidants, to generate electric power and reaction products. Electrochemical fuel cells generally employ an electrolyte disposed between two electrodes, namely a cathode and an anode. An electrocatalyst is needed to induce the desired electrochemical reactions at the electrodes. Solid polymer fuel cells operate in a range from about 80° C. to about 200° C. and are particularly preferred for portable and motive applications. Solid polymer fuel cells employ a membrane electrode assembly (MEA) which comprises a solid polymer electrolyte or ion-exchange membrane disposed between the two electrode layers. Flow field plates for directing the reactants across one surface of each electrode substrate are generally disposed on each side of the MEA. The electrocatalyst used may be a metal black, an alloy or a supported metal catalyst, for example, platinum on carbon. The electrocatalyst is typically incorporated at the electrode/electrolyte interfaces. This can be accomplished, for example, by depositing it on a porous electrically conductive sheet material, or "electrode substrate", or on the membrane electrolyte.

Effective sites on the electrocatalyst are accessible to the reactant, are electrically connected to the fuel cell current collectors, and are ionically connected to the fuel cell electrolyte. Electrons, protons, and possibly other species are typically generated at the anode electrocatalyst. The electrolyte is typically a proton conductor, and protons generated at the anode electrocatalyst migrate through the electrolyte to the cathode.

A measure of electrochemical fuel cell performance is the voltage output from the cell for a given current density. Higher performance is associated with a higher voltage output for a given current density or higher current density for a given voltage output. Another measure of fuel cell performance is the Faradaic efficiency, which is the ratio of the actual output current to the total current associated with the consumption of fuel in the fuel cell. For various reasons, fuel can be consumed in fuel cells without generating an output current, such as when an oxygen bleed is used in the fuel stream (for removing carbon monoxide impurity) or when fuel crosses through a membrane electrolyte and reacts on the cathode instead. A higher Faradaic efficiency thus represents a more efficient use of fuel.

A broad range of reactants have been contemplated for use in electrochemical fuel cells, which reactants may be delivered in gaseous or liquid streams. The oxidant may, for example, be substantially pure oxygen or a dilute oxygen stream such as air. The fuel stream may be substantially pure hydrogen gas, a gaseous hydrogen-containing reformate stream derived from a suitable feedstock, or a suitable gaseous or liquid organic fuel mixture.

The choice of fuel may vary depending on the fuel cell application. Preferably, the fuel is relatively reactive electrochemically, inexpensive, easy to handle, and relatively safe for the environment. Hydrogen gas is a preferred fuel since it is electrochemically reactive and the by-products of the fuel cell reaction are simply heat and water. However, hydrogen can be more difficult to store and handle than other fuels or fuel feedstocks, particularly in non-stationary applications (e.g., portable or motive). For this reason, liquid fuels are preferred in many applications.

Fuel cell systems employing liquid fuels generally incorporate a reformer to generate hydrogen as required from a liquid feedstock that is easier to store and handle (e.g., methanol). However, the use of a reformer complicates the construction of the system and results in a loss in system efficiency. To avoid using a separate reformer, fuels other than hydrogen may instead be used directly in fuel cells (i.e., supplied unreformed to the fuel cell anodes). Inside the fuel cell, a fuel mixture may be reacted electrochemically (directly oxidized) to generate electricity or instead it may first be reformed in-situ (internally reformed), as in certain high temperature fuel cells (e.g., solid oxide fuel cells). After being internally reformed, the fuel is then electrochemically converted to generate electricity. While such fuel cell systems may employ fuels that are easier to handle than hydrogen, and without the need for a separate reformer subsystem, generally hydrogen offers fundamental advantages with regard to performance and the environment. Thus, improvements in these areas are desirable in order for internally reforming and direct oxidation fuel cell systems to compete more favorably to hydrogen-based systems.

A direct methanol fuel cell (DMFC) is a type of direct oxidation fuel cell that has received much attention recently. A DMFC is generally a liquid feed solid polymer fuel cell that operates directly on an aqueous methanol fuel mixture. The anode and cathode reactions in a direct methanol fuel cell are shown in the following equations:

Anode reaction: $CH_3OH + H_2O \Rightarrow 6H^+ + CO_2 + 6e^-$

Cathode reaction: $3/2 O_2 + 6H^+ + 6e^- \Rightarrow 3H_2O$

Overall reaction: $CH_3OH + 3/2 O_2 \Rightarrow CO_2 + 2H_2O$

There is often a problem in DMFCs with substantial crossover of methanol fuel from the anode to the cathode side through the membrane electrolyte. The methanol that crosses over then reacts with oxidant at the cathode and cannot be recovered, resulting in significant fuel inefficiency and deterioration in fuel cell performance. To reduce crossover, very dilute solutions of methanol (e.g., about 5% methanol in water) are typically used as fuel streams in DMFCs. Unfortunately, such dilute solutions afford only minimal protection against freezing during system shutdown in cold weather conditions, typically down to about −5° C.

In order to overcome the disadvantages of aqueous methanol fuel mixtures, efforts have been made to develop alternative liquid fuels for direct use in direct liquid feed fuel cells (DLFFCs). For example, published PCT WO 96/12317 discloses alternative liquid fuels for use within DLFFCs, including dimethoxymethane, trimethoxymethane, and trioxane. Additionally, in published PCT WO 99/44253, the direct use of dimethyl ether (DME) in a DLFFC is disclosed. Like methanol, these fuels can be oxidized at the fuel cell anode to form carbon dioxide and water at a rate that provides satisfactory fuel cell performance.

Recently, significant efforts have been made to develop micro direct liquid feed fuel cells (MDLFFCs) for low-power and portable applications, such as cellular phones. For simplification and to reduce size, a MDLFFC preferably contains no air or fuel pumps, with the reactants being passively supplied to the electrodes instead. Conventional methods for feeding fuel to the fuel cell stack in a MDLFFC include the use of gravitational flow, capillary flow, natural diffusion and/or natural convection of the fuel from a fuel reservoir to the anodes. Fuel cell reaction products are transported away from the anode and cathode surfaces to the atmosphere by means of natural diffusion and/or convection. For example, Mench et al. ("Design of a Micro Direct Methanol Fuel Cell ($\mu$DMFC)", International Mechanical Engineering Congress and Exposition, New York, N.Y., Nov. 11–16, 2001) discloses a micro DMFC which uses gravitational and capillary forces to feed fuel to its anodes, having a total volume of 1 $cm^3$ and expected to have a power density of about 1 $W/cm^3$. Similarly, Narayanan et al. ("Design and Development of Miniature DMFC Power Sources for Cellular Phone Applications", 2000 Fuel Cell Seminar Abstracts, Portland, Oreg. Oct. 30–Nov. 2, 2000, pp. 795–798) discloses a micro DMFC fed by diffusion that yields a power density of about 8 $mW/cm^2$.

While significant advances have been made in this field, there remains a need in the art for new and effective fuels that provide comparable performance to an aqueous methanol fuel solution in both DLFFCs and MDLFFCs. The present invention fulfills these needs and provides further related advantages.

BRIEF SUMMARY OF THE INVENTION

It has been discovered that surprisingly good performance can be obtained from a fuel cell operating directly on a mixture of tetramethyl orthocarbonate (TMOC) and water, wherein TMOC is directly oxidized to generate protons at the anode electrocatalyst. The performance of direct TMOC solid polymer fuel cells and micro direct TMOC solid polymer fuel cells compare favorably to the performance of direct methanol fuel cells (DMFCs) and micro direct methanol fuel cells (MDMFCs), respectively. Although the performance is typically lower for an aqueous TMOC fuel mixture at a given current density, the performance range is sufficient to provide an acceptable fuel. Additionally, TMOC has a higher boiling point than methanol, which results in an aqueous TMOC fuel mixture having a lower vapor pressure than an aqueous methanol fuel mixture. Furthermore, TMOC is relatively nontoxic compared to other fuels such as methanol.

In a direct TMOC fuel cell, a mixture comprising TMOC and water is supplied directly to the fuel cell anode for direct oxidation therein. Accordingly, a direct TMOC fuel cell system comprises a system for supplying a TMOC and water mixture to the anode. The fuel stream may contain other reactants and is desirably supplied as a liquid.

The efficiency of a direct TMOC fuel cell system is generally improved by re-circulating any unreacted TMOC and water back into the mixture supplied to the anode. Unreacted TMOC and water are generally present in the anode exhaust, and may also be present in the cathode exhaust as a result of crossover through the electrolyte. A significant amount of product water is also generally present in the cathode exhaust. To re-circulate TMOC and water from an electrode exhaust, a re-circulation loop can be employed that fluidly connects the electrode exhaust to a mixing apparatus inlet. A heat exchanger may be employed in the re-circulation loop to cool the fuel stream discharged from the electrode.

A representative embodiment of a system for directly supplying TMOC in a fuel cell system may additionally comprise a mixing apparatus for providing the mixture to the fuel cell. Mixing apparatus inlets may be fluidly connected to a TMOC supply, a water supply and a re-circulation loop, while a mixing apparatus outlet may be fluidly connected to the anode of the fuel cell. Additionally, a sensor may be employed to monitor and control the concentration of TMOC in the mixture and if the re-circulated TMOC and water mixture contains a lower concentration of TMOC than is desired in the mixture, the desired concentration can be prepared by suitably augmenting the mixture with fuel from the TMOC supply.

As in a direct TMOC fuel cell, in a micro direct TMOC fuel cell, a mixture comprising TMOC and water is supplied directly to the fuel cell anode for direct oxidation therein. In a representative embodiment, the mixture is fed to the anode of the fuel cell from a fuel reservoir by gravitational flow, capillary flow, natural diffusion and/or natural convection and fuel cell reaction products are transported away from the anode and cathode surfaces to the atmosphere by means of natural diffusion and/or convection.

These and other aspects of the invention will be evident upon reference to the attached Figures and following detailed description. To that end, all documents cited herein are incorporated by reference in their entirety.

BRIEF DESCRIPTION OF THE SEVERAL VIEWS OF THE DRAWING(S)

DETAILED DESCRIPTION OF THE INVENTION

Tetramethyl orthocarbonate (TMOC) is available in quantity and is relatively nontoxic compared to other fuels such as methanol. TMOC is a liquid at room temperature and pressure and is fairly soluble in water. Furthermore, TMOC has a higher boiling point (114° C.) than methanol and an aqueous TMOC fuel mixture has a lower vapor pressure than an aqueous methanol fuel mixture.

In one embodiment, a fuel cell system is disclosed that comprises a solid polymer fuel cell operating directly on TMOC. TMOC reacts directly with water at the fuel cell anode to generate protons, electrons, and carbon dioxide. At the cathode, the protons and electrons combine with oxygen to generate water. The fuel stream supplied to the anode thus comprises a suitable mixture of TMOC and water. For volume efficiency, particularly for non-stationary applications, the fuel stream and/or its constituents may be stored in liquid form.

Figure 1:
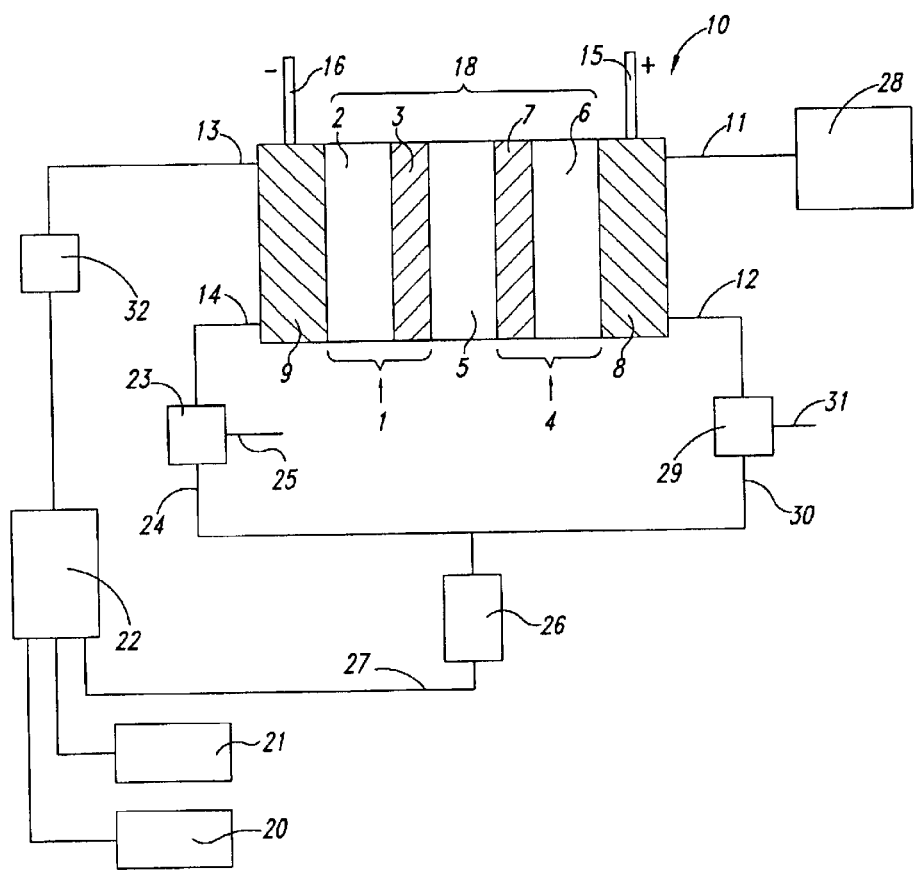
FIG. 1 shows a schematic diagram of a representative direct TMOC solid polymer fuel cell system.

FIG. 1 shows a schematic diagram of a representative direct TMOC solid polymer fuel cell system operating on a liquid fuel feed and employing exhaust re-circulation. Liquid feed fuel cell 10 contains a membrane electrode assembly (MEA) 18 comprising a porous cathode 4 and porous anode 1 that are bonded to a solid polymer membrane electrolyte 5. The porous anode 1 typically comprises a carbonaceous substrate 2 and electrocatalyst layer 3. Proton conducting ionomer is preferably dispersed throughout the electrocatalyst layer 3 and, optionally, the substrate 2. In a like manner, porous cathode 4 typically comprises a carbonaceous substrate 6 and electrocatalyst layer 7 with ionomer similarly dispersed throughout. Oxidant flow field 8 and liquid fuel flow field 9 are pressed against cathode substrate 6 and anode substrate 2, respectively, on the faces opposite the membrane electrolyte 5. Fuel cell 10 has an oxidant inlet 11, an oxidant outlet 12, a liquid fuel stream inlet 13, and a liquid fuel stream outlet 14. Electrical power is obtained from the fuel cell via positive and negative terminals 15 and 16, respectively.

As shown in FIG. 1, the fuel stream is a TMOC/water mixture derived from a TMOC supply 20, a water supply 21, and a re-circulated TMOC/water mixture from line 27. In alternate embodiments, water supply 21 may be omitted and water may instead be provided to the mixture either as an additional component in TMOC supply 20 or solely from product water in re-circulation line 27. A sensor 32 is employed to monitor and control the concentration of TMOC in the fuel stream. If the re-circulated TMOC/water mixture contains a lower concentration of TMOC than is desired in the fuel stream, the desired concentration can be prepared by suitably augmenting the mixture with fuel from TMOC supply 20. Other arrangements may be utilized, however, depending on the specifics of system construction and operation.

Fluids from each of the TMOC supply 20, water supply 21, and line 27 are supplied to inlets of mixing apparatus 22 in which the fluids are combined to form an appropriate fuel stream. The solubility of TMOC in water is relatively high. Accordingly, if desired, the fuel stream may contain a high concentration of fuel in order to obtain higher rates of reaction and to reduce the amount of water circulating through the anode. Suitable fuel mixtures contain 0.05 to 1.0 moles of TMOC per liter of the fuel mixture, and more particularly 0.1 to 0.5 moles of TMOC per liter of the fuel mixture.

The fuel stream in FIG. 1 flows through fuel flow field 9 and the excess is then discharged to separator 23 where carbon dioxide reaction product may be separated from unreacted TMOC and water in the fuel stream exhaust. Carbon dioxide may then be vented via line 25 while the unreacted TMOC/water mixture may be re-circulated via line 24. A heat exchanger 26 may be employed to cool some or all of the re-circulating fluid stream.

The oxidant stream in FIG. 1 is provided by an air supply 28 and flows through oxidant flow field 8.

Under the above fuel stream conditions, and depending on the membrane electrolyte 5, in particular the membrane pore size, TMOC may cross over to the cathode in otherwise conventional solid polymer fuel cell constructions. Due to the size of TMOC molecules, the amount of any cross over is relatively small in comparison to the amount of cross over experienced with fuel streams comprising smaller molecules such as methanol.

Any unreacted TMOC at the cathode is desirably recovered and thus a re-circulation loop from the cathode exhaust may also be employed as shown in FIG. 1. Separator 29 may be used to separate oxygen and any carbon dioxide from TMOC and water in the cathode exhaust. The former may be vented out line 31 while the latter may be re-circulated via line 30. Separator 29 may for example employ pressure swing absorption, water absorption, or membrane separation methods to accomplish such separation.

The complex electrochemical reactions that take place in a direct TMOC solid polymer fuel cell are not completely understood. However, without being bound by theory, the following proposed reactions and discussions appear to match the observations to date.

At the anode:

$$(CH_3O)_4C + 6H_2O \Rightarrow 24H^+ + 5CO_2 + 24e^- \qquad (1)$$

At the cathode:

$$6O_2 + 24H^+ + 24e^- \Rightarrow 12H_2O \qquad (2)$$

The overall fuel cell reaction may be written as:

$$(CH_3O)_4C + 6O_2 \Rightarrow 5CO_2 + 6H_2O \qquad (3)$$

In addition, TMOC may first interact with a number of water molecules to produce methanol molecules as intermediates. These methanol molecules may then either be oxidized as in a conventional direct methanol fuel cell (according to the reaction $CH_3OH + H_2O \Rightarrow 6H^+ + CO_2 + 6e^-$) or cross over through the membrane. Any methanol that crosses over generally reacts readily at the cathode and thus typically little methanol is found in the cathode exhaust. Carbon dioxide appears in the cathode exhaust, however, as a product of the methanol crossover reaction and also from crossover of carbon dioxide produced at the anode.

In another embodiment, a fuel cell system is disclosed that comprises a micro direct liquid feed fuel cell (MDLFFC) operating directly on TMOC. As in the previous embodiment, TMOC reacts directly with water at the MDLFFC anodes to generate protons, electrons, and carbon dioxide. At the cathodes, the protons and electrons combine with oxygen to generate water. Accordingly, the fuel supplied to the anode comprises a suitable mixture of TMOC and water.

A representative micro direct TMOC fuel cell is similar to the micro direct methanol fuel cells (MDMFCs) disclosed in Mench et al. and Narayanan et al. (both of which are incorporated herein by reference in their entirety). As in a MDMFC, in a representative micro direct TMOC fuel cell, TMOC is fed to the anodes of the fuel cell from a fuel reservoir by any suitable means, including gravitational flow, capillary flow, natural diffusion and/or natural convection and fuel cell reaction products are transported away from the anode and cathode surfaces to the atmosphere by, for example, natural diffusion and/or convection. Other arrangements may be utilized however depending on the specifics of system construction and operation.

The following examples have been included to illustrate different embodiments and aspects of the invention but these should not be construed as limiting in any way.

EXAMPLES

In all cases, TMOC was purchased from Aldrich and aqueous TMOC and methanol solutions were prepared using analytical grade methanol and deionized water.

Example 1

Electrochemical Test Cells

A cyclic voltammetry curve was obtained for aqueous fuel solutions of TMOC in a voltage range of interest for fuel cell operation. Measurements were made in a test cell containing 0.1M sulfuric acid at 95° C. at ambient pressure using three electrodes: a working graphite disk electrode (0.21 cm$^2$) coated with Pt black or Pt/Ru (atomic ratio 50/50) catalyst (Johnson Matthey, 1.5 mg/cm$^2$ loading); a counter Pt electrode; and a reference electrode (Saturated Calomel Electrode, abbreviated as SCE). The entire electrochemical cell was immersed in a thermo-bath for temperature control purposes. The aqueous fuel solution was added to the acid electrolyte while the working electrode potential was controlled through a potentiostat and swept at 20 mV/s in the potential range of –0.2 V to 1.2 V (vs. SCE).

Figure 2:
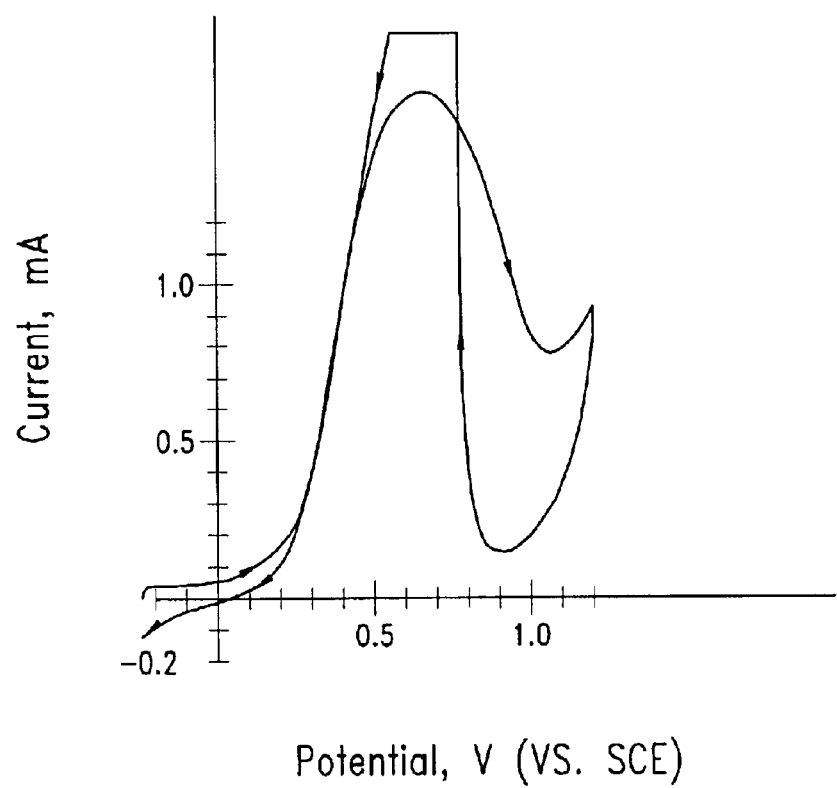
FIG. 2 shows a cyclic voltammetry curve for an aqueous solution of TMOC in a voltage range of interest for fuel cell operation on a working graphite disk electrode coated with Pt black catalyst.

FIG. 2 shows the results of cyclic voltammetry (current as a function of voltage versus SCE) for 0.01 M TMOC in water on a working graphite disk electrode coated with Pt black catalyst.

Figure 3:
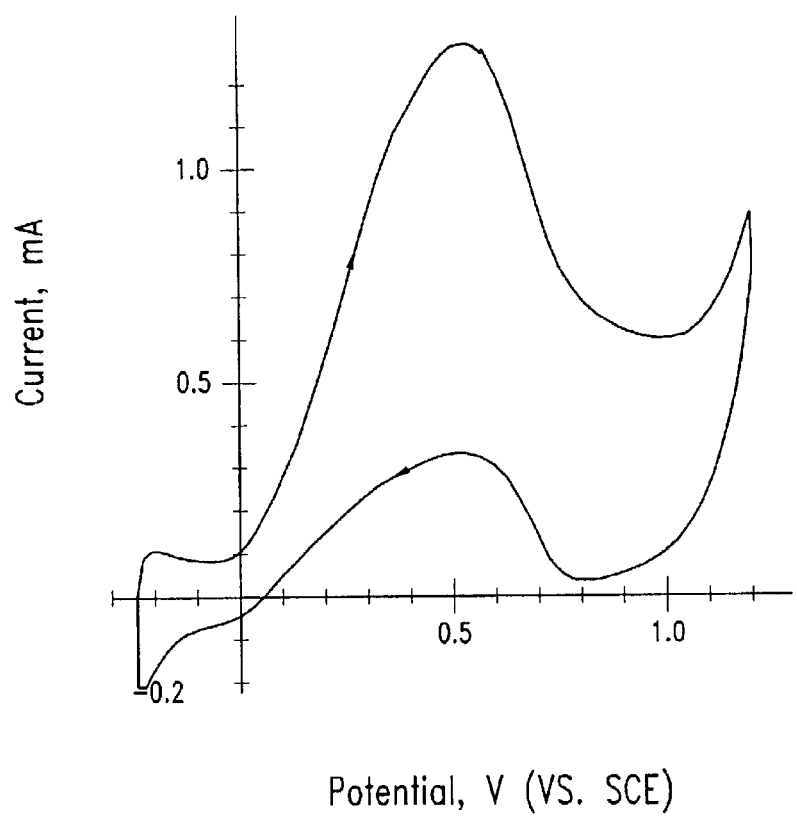
FIG. 3 shows a cyclic voltammetry curve for an aqueous solution of TMOC in a voltage range of interest for fuel cell operation on a working graphite disk electrode coated with Pt/Ru catalyst.

FIG. 3 shows the results of cyclic voltammetry (current as a function of voltage versus SCE) for 0.01 M TMOC in water on a working graphite disk electrode coated with Pt/Ru catalyst.

The aqueous TMOC solution shows substantial activity during each sweep and accordingly, under the above conditions, TMOC is a suitable fuel for a direct oxidation fuel cell.

Example 2

Direct Liquid Feed Fuel Test Cells

Solid polymer fuel cells were constructed and tested under varying conditions using aqueous TMOC solutions as the supplied fuel streams. Aqueous methanol fuel streams were also used for comparative purposes. Low pressure air was used as the oxidant.

A single direct liquid feed fuel cell (DLFFC) was assembled comprising a membrane and electrode assembly (MEA) in which the cathode was prepared from TGP-H-060 (product of Toray Industries, Inc.) with 6% by weight PTFE binder, a 0.6 mg/cm$^2$ carbon base layer and a loading of 3.6 mg/cm$^2$ platinum black catalyst. The anode was prepared from TGP-H-060 and contained 4.1 mg/cm$^2$ of Johnson Matthey Platinum/Ruthenium Black catalyst. The proton conducting membrane was NAFION® 117. The electrochemically active area for the membrane electrode assembly was 5.7 cm$^2$.

The cell was operated at 95° C. at ambient pressure and was supplied with reactants at ambient temperature (about 25° C.). Fluid flow rates were such that the oxidant stoichiometry was 3.

Figure 4:
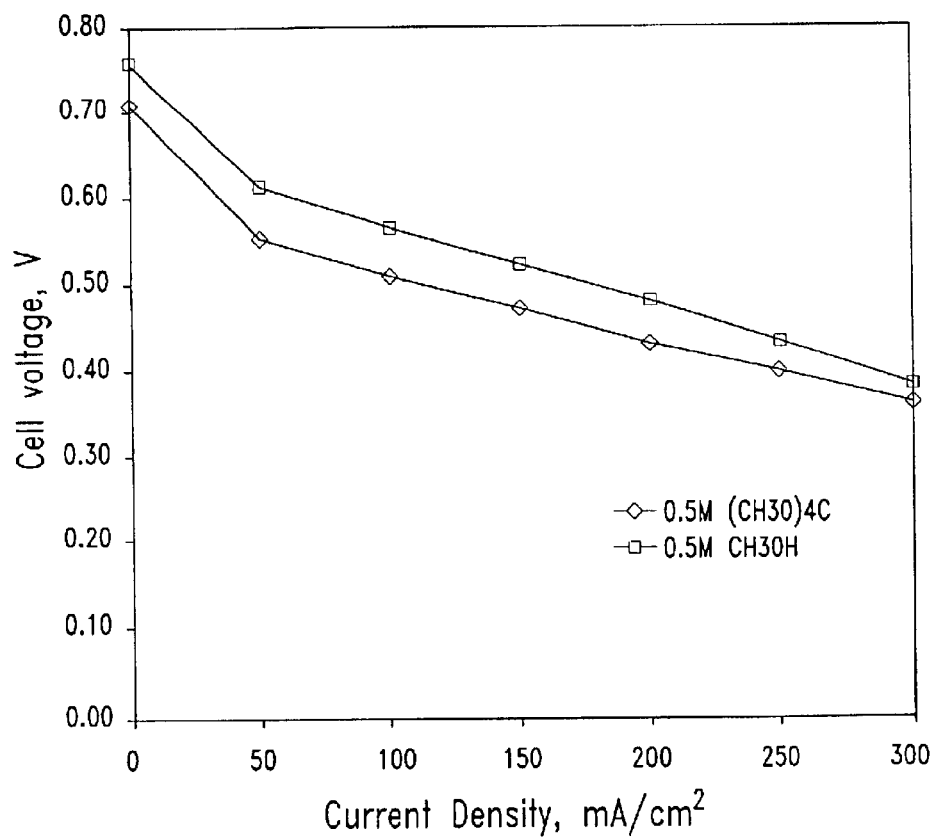
FIG. 4 shows polarization curves for a single direct liquid feed fuel cell employing a TMOC fuel stream.

FIG. 4 shows polarization curves for the DLFFC described above employing a 0.5 M aqueous TMOC fuel stream. For comparison purposes, FIG. 4 also shows a polarization curve for a DLFFC employing a 0.5 M aqueous methanol fuel stream. In FIG. 4, the x-axis shows current density expressed in milliamperes per square centimeter and the y-axis expresses cell voltage in volts.

The performance of a DLFFC employing an aqueous TMOC fuel stream compares favorably to the performance of a DLFFC employing an aqueous methanol fuel stream. Although the performance is typically about 50 mV lower for the TMOC fuel stream at a given current density, such a range is reasonable and indicates that TMOC would be an acceptable fuel for use in DLFFCs. Performance may be improved through optimization of the fuel cell hardware design, the MEA structure and operational conditions.

Example 3

Micro Direct Liquid Feed Fuel Test Cells

A micro direct liquid feed fuel test cell (MDLFFC) was constructed and tested under varying conditions using aqueous TMOC solutions as the supplied fuel. Aqueous methanol fuel solutions were also tested for comparative purposes.

Figure 5:
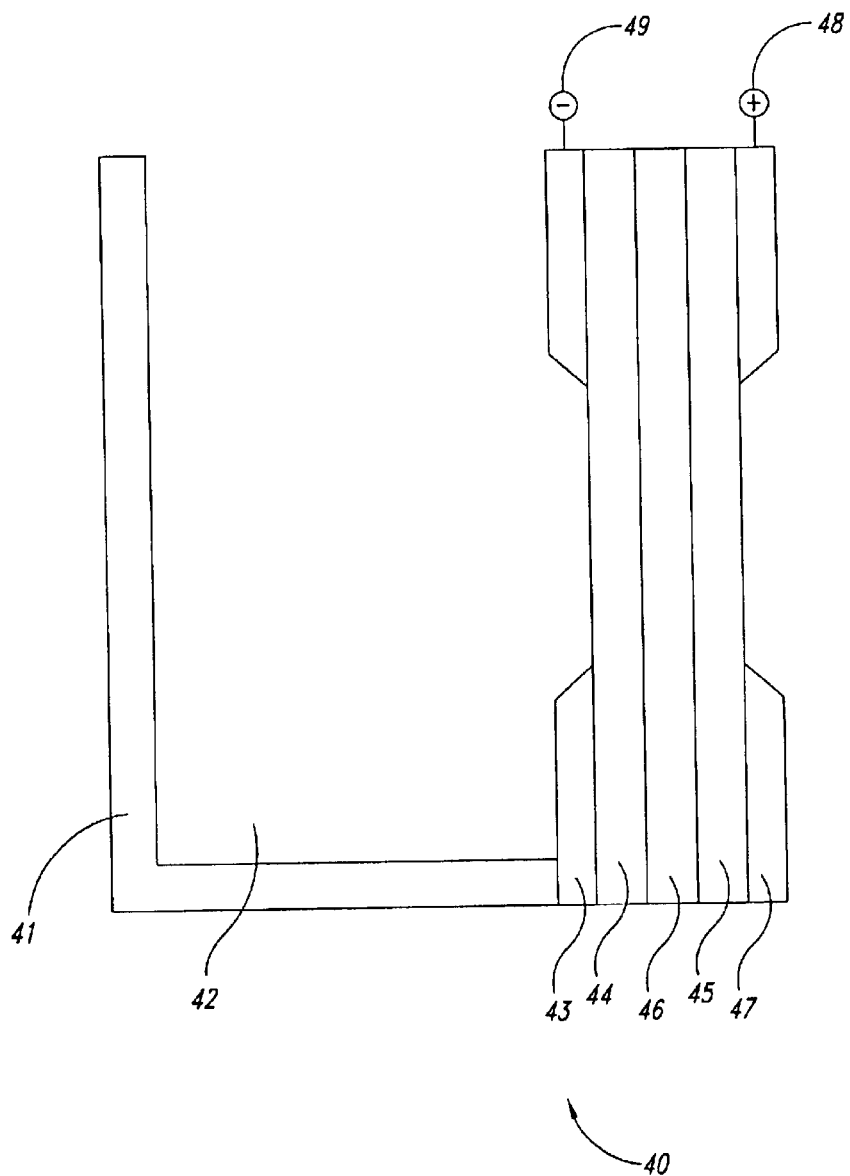
FIG. 5 shows a schematic diagram of a micro direct liquid feed fuel test cell.

FIG. 5 shows a schematic diagram of the micro direct liquid feed fuel test cell employed. As illustrated, fuel cell 40 contains a membrane electrode assembly (MEA) comprising a porous cathode 45 and porous anode 44 that are bonded to a solid polymer membrane electrolyte 46. As in FIG. 1, anode 44 and cathode 45 each comprise a carbonaceous substrate and electrocatalyst layer wherein a proton conducting ionomer is dispersed throughout both the electrocatalyst layer and the substrate. Conductive anode plate 43 and conductive cathode plate 47 are pressed against anode 44 and cathode 45, respectively, on the faces opposite the membrane electrolyte 46. Electrical power is obtained from the fuel cell via positive and negative terminals 48 and 49, respectively.

As shown in FIG. 1, an aqueous fuel supply is contained in area 42 within fuel reservoir 41. The aqueous fuel is supplied to anode 44 by conductive anode plate 43 primarily through gravitational forces. Air is supplied to cathode 45 by conductive cathode plate 47 through natural convection.

The MEA employed was similar the MEA described in Example 2 above. The cathode was prepared from TGP-H-060 (product of Toray Industries, Inc.) with 6% by weight PTFE binder, a 0.6 mg/cm$^2$ carbon base layer and a loading of 3.6 mg/cm$^2$ platinum black catalyst. The anode was prepared from TGP-H-090 and contained 4.2 mg/cm$^2$ of Johnson Matthey Platinum/Ruthenium Black catalyst. The proton conducting membrane was NAFION® 117. The electrochemically active area for the MEA was 0.5 cm$^2$. The cell was operated at 22–25° C. at ambient pressure and was supplied with reactants at ambient temperature (about 25° C.).

Figure 6:
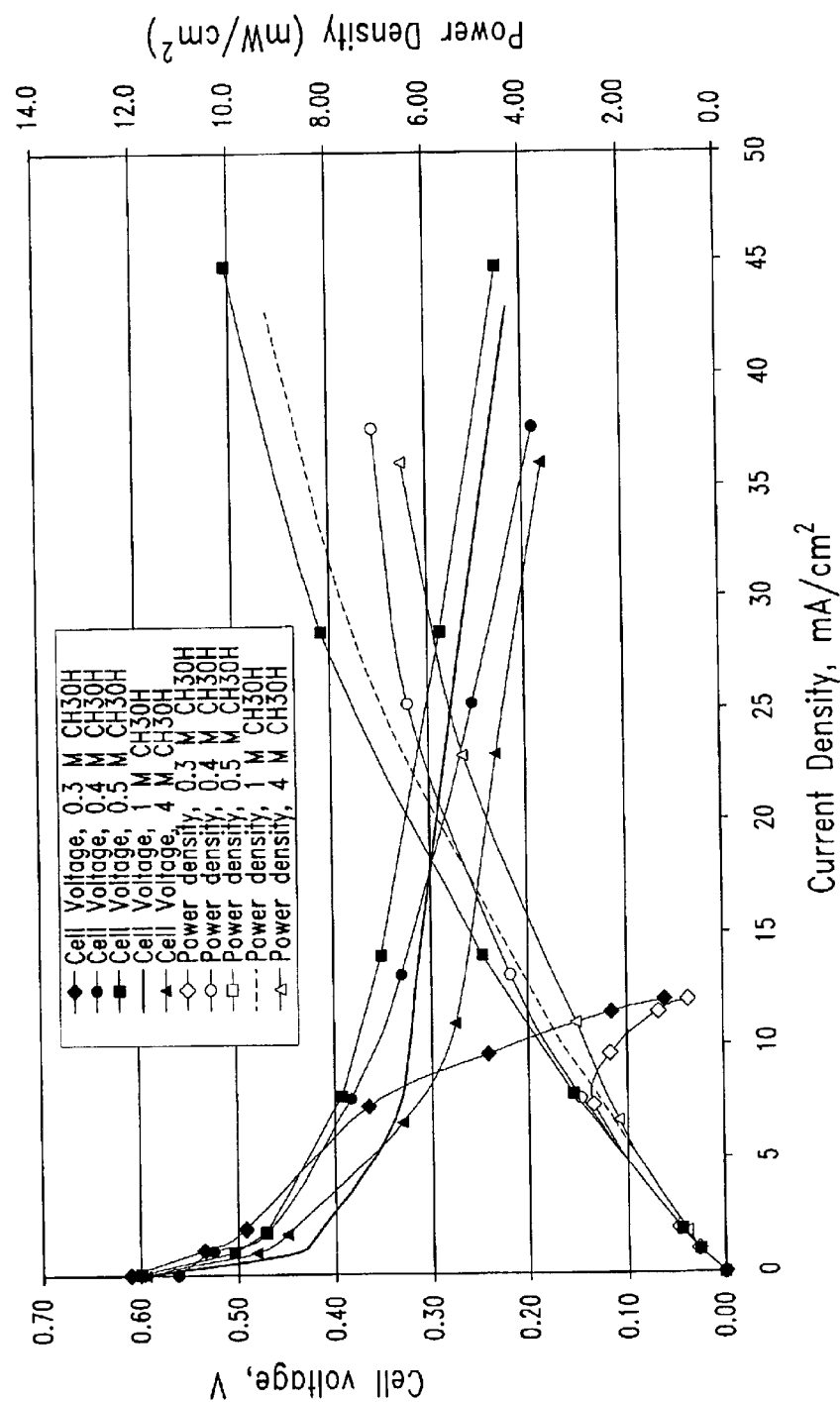
FIG. 6 shows polarization and power density curves for the micro direct liquid feed fuel test cell of FIG. 5 employing aqueous fuel solutions with five different methanol concentrations.
Figure 7:
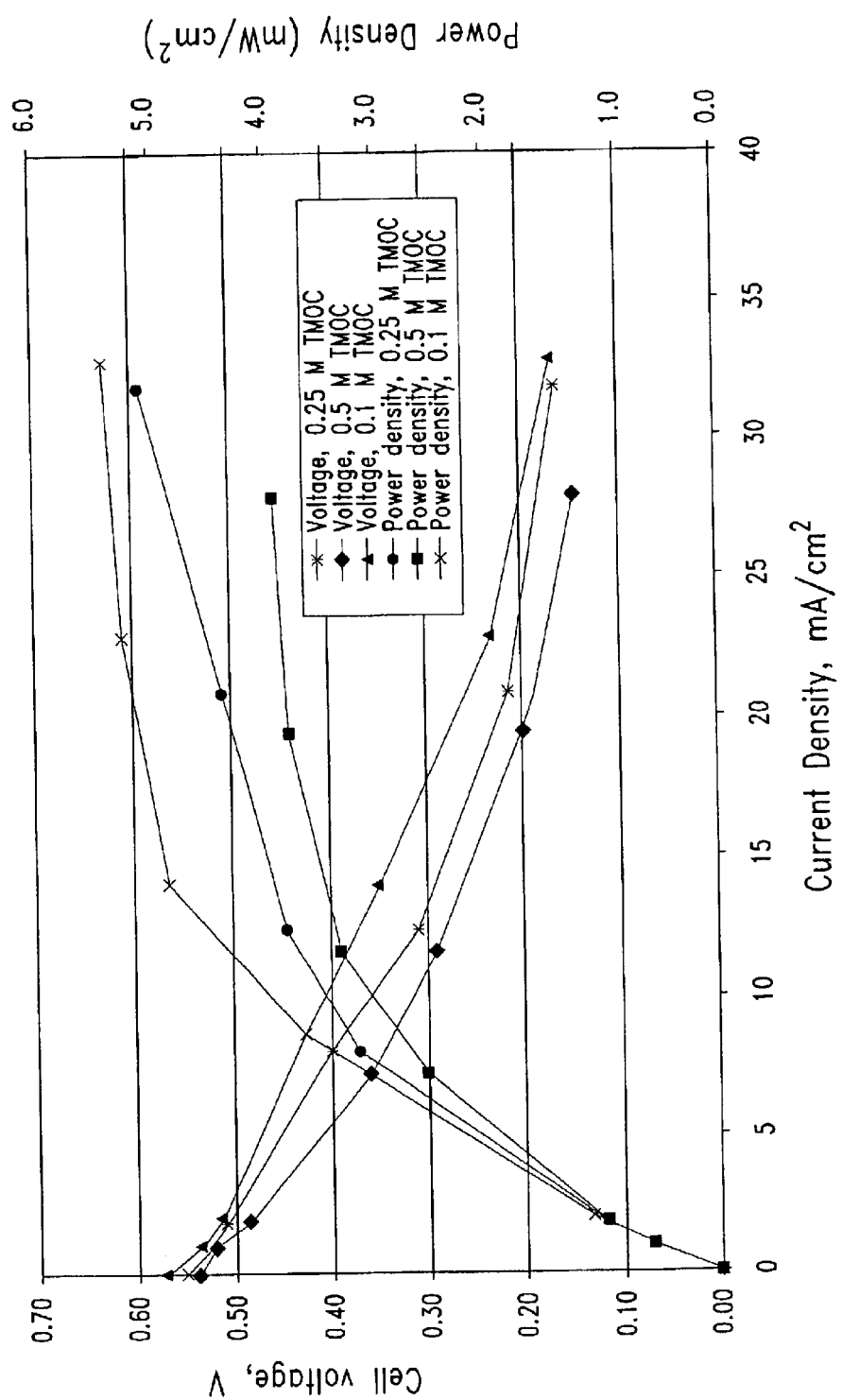
FIG. 7 shows polarization and power density curves for the micro direct liquid feed fuel test cell of FIG. 5 employing aqueous fuel solutions with three different TMOC concentrations.

FIG. 6 shows polarization and power density curves for the MDLFFC described above employing aqueous fuel solutions with five different methanol concentrations (i.e., 0.3 M, 0.4 M, 0.5 M, 1.0 M and 4.0 M). FIG. 7 shows polarization and power density curves for the MDLFFC described above employing aqueous fuel solutions with three different TMOC concentrations (i.e., 0.1 M, 0.25 M and 0.5 M). In both FIGS. 6 and 7, the x-axis shows current density expressed in milliamperes per square centimeter. The left y-axis expresses cell voltage in volts and the right y-axis expresses cell power density in milliwatts per square centimeter.

The performance of the MDLFFC employing an aqueous TMOC fuel solution is generally comparable to the performance of the MDLFFC employing an aqueous methanol fuel solution. The performance results in Example 2 suggest equal performance may be obtained with an aqueous TMOC fuel solution through optimization of the fuel cell hardware design, the MEA structure and operational conditions. Furthermore, TMOC has a higher boiling point, and consequently a lower vapor pressure, than methanol and is relatively nontoxic in comparison to other fuels. Accordingly, TMOC would be an acceptable fuel for use in MDLFFCs.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of operating a fuel cell having a cathode, an anode and an electrolyte, the method comprising supplying a mixture of tetramethyl orthocarbonate and water to the anode.

2. The method of claim 1 wherein the fuel cell is a solid polymer fuel cell and the electrolyte comprises a proton exchange membrane.

3. The method of claim 1 wherein the mixture is a liquid.

4. The method of claim 1 wherein the mixture comprises 0.05 moles to 1.0 mole of tetramethyl orthocarbonate per liter of the mixture.

5. The method of claim 1 wherein the mixture comprises 0.1 moles to 0.5 moles of tetramethyl orthocarbonate per liter of the mixture.

6. The method of claim 1 wherein the mixture comprises 0.1 moles to 0.3 moles of tetramethyl orthocarbonate per liter of the mixture.

7. The method of claim 1 wherein the fuel cell is a micro direct liquid feed fuel cell.

8. The method of claim 1, further comprising re-circulating tetramethyl orthocarbonate and water from an anode exhaust of the fuel cell into the mixture.

9. The method of claim 1, further comprising re-circulating tetramethyl orthocarbonate and water from a cathode exhaust of the fuel cell into the mixture.

10. A fuel cell system comprising a fuel cell having a cathode, an anode, and an electrolyte, wherein the anode is supplied with a mixture of tetramethyl orthocarbonate and water.

11. The fuel cell system of claim 10, further comprising a mixing apparatus, wherein an outlet of the mixing apparatus is fluidly connected to the anode and inlets of the mixing apparatus are fluidly connected to supplies of tetramethyl orthocarbonate and water.

12. The fuel cell system of claim 11, further comprising a re-circulation loop fluidly connecting an electrode exhaust of the fuel cell to an inlet of the mixing apparatus.

13. The fuel cell system of claim 12 wherein the re-circulation loop fluidly connects a cathode exhaust of the fuel cell to the inlet of the mixing apparatus.

14. The fuel cell system of claim 12 wherein the re-circulation loop fluidly connects an anode exhaust of the fuel cell to the inlet of the mixing apparatus.

15. The fuel cell system of claim 12, further comprising a sensor adapted to detect the composition of the mixture.

16. The fuel cell system of claim 12 wherein the re-circulation loop further comprises a heat exchanger.

17. The fuel cell system of claim 10 wherein the fuel cell is a solid polymer fuel cell and the electrolyte comprises a proton exchange membrane.

18. The fuel cell system of claim 10 wherein the mixture is a liquid.

19. The fuel cell system of claim 10 wherein the mixture comprises 0.05 moles to 1.0 mole of tetramethyl orthocarbonate per liter of the mixture.

20. The fuel cell system of claim 10 wherein the mixture comprises 0.1 moles to 0.5 moles of tetramethyl orthocarbonate per liter of the mixture.

21. The fuel cell system of claim 10 wherein the mixture comprises 0.1 moles to 0.3 moles of tetramethyl orthocarbonate per liter of the mixture.

22. The fuel cell system of claim 10 wherein the fuel cell is a micro direct liquid feed fuel cell.

* * * * *